United States Patent [19]

Rau et al.

[11] Patent Number: 4,665,695
[45] Date of Patent: May 19, 1987

[54] HYDROSTATIC LOAD SENSE STEERING SYSTEM

[75] Inventors: Jim L. Rau, Lafayette; Ronald L. LaHue, West Lafayette, both of Ind.

[73] Assignee: TRW Inc., Cleveland, Ohio

[21] Appl. No.: 243,497

[22] Filed: Mar. 13, 1981

[51] Int. Cl.⁴ .............................................. F15B 11/16
[52] U.S. Cl. ..................................... 60/384; 60/422; 180/132
[58] Field of Search ................. 60/384, 420, 450, 484, 60/422; 91/446; 180/132, 141

[56] References Cited

U.S. PATENT DOCUMENTS

| | | |
|---|---|---|
| 3,815,477 | 6/1974 | Ailshie et al. |
| 3,931,711 | 1/1976 | Rau et al. |
| 4,043,419 | 8/1977 | Larson et al. |
| 4,079,805 | 3/1978 | Rau et al. |
| 4,167,893 | 9/1979 | Johnson |
| 4,385,674 | 5/1983 | Presley .............................. 60/422 X |

*Primary Examiner*—John A. Pekar
*Attorney, Agent, or Firm*—Tarolli, Sundheim & Covell

[57] ABSTRACT

A system for controlling fluid flow from a source to a steering motor and one or more auxiliary motors comprises a priority valve and a steering controller. The priority valve has a housing that includes an inlet port connected to the source, a priority flow outlet port, an auxiliary flow outlet port, and a pilot port. A biasing spring urges the priority valve spool toward a priority position directing all flow from the inlet port to the priority port. The priority valve includes a pilot flow conduit directing a pilot flow of fluid through an orifice to the pilot port. Pressure upstream of the pilot flow orifice acts on the priority valve spool in opposition to the spring, and pressure downstream of the pilot flow orifice acts on the valve spool in addition to the spring. The steering controller has a load sense cavity communicating with a load sense port, and a neutral vent orifice which, when the steering controller is in neutral, communicates said load sense cavity with a return port for allowing a pilot flow of fluid from the pilot port of the priority valve to flow through said steering controller to the reservoir. Upon activation from its neutral position, the steering controller substantially restricts flow through the neutral vent orifice to the reservoir before its main flow control orifice opens.

8 Claims, 23 Drawing Figures

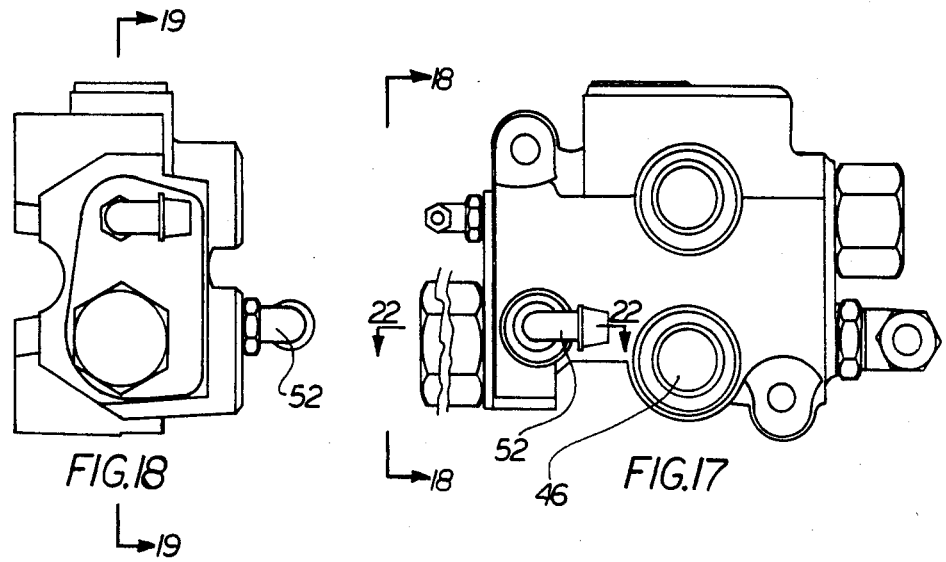
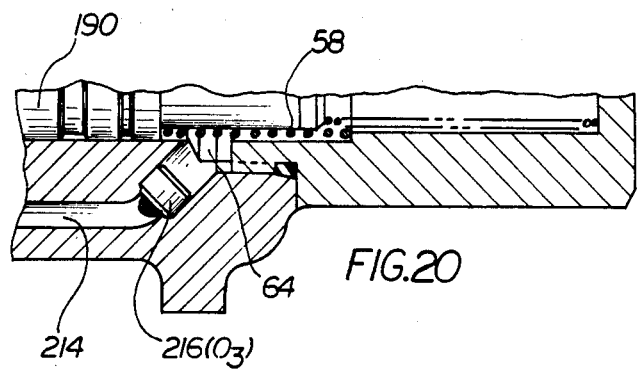
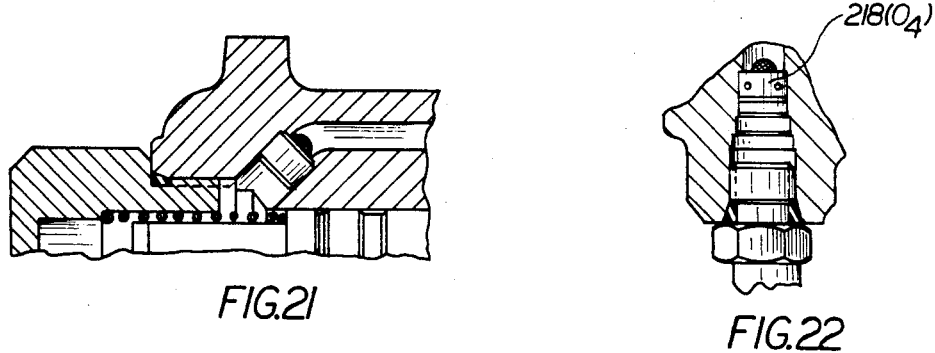

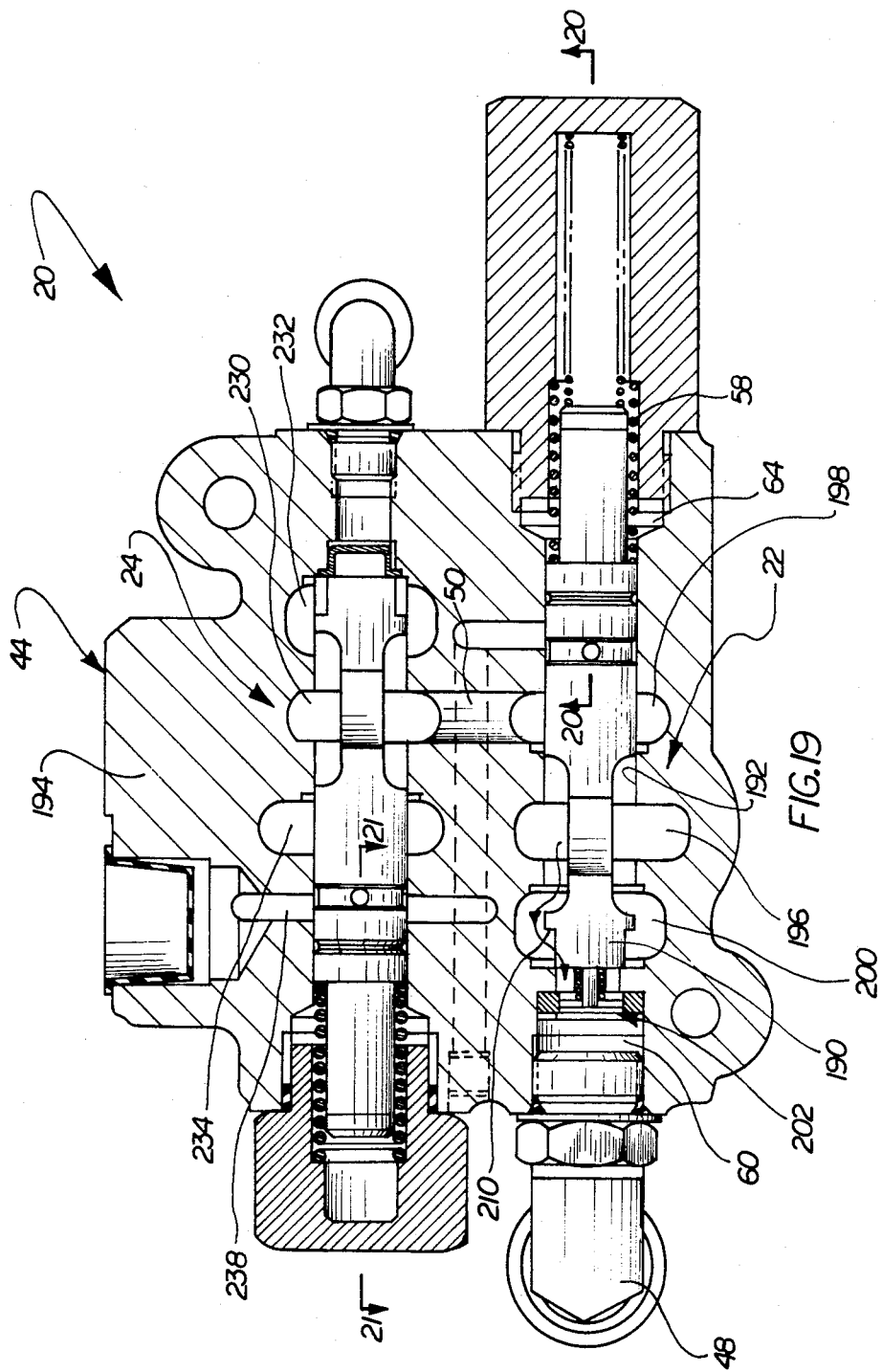

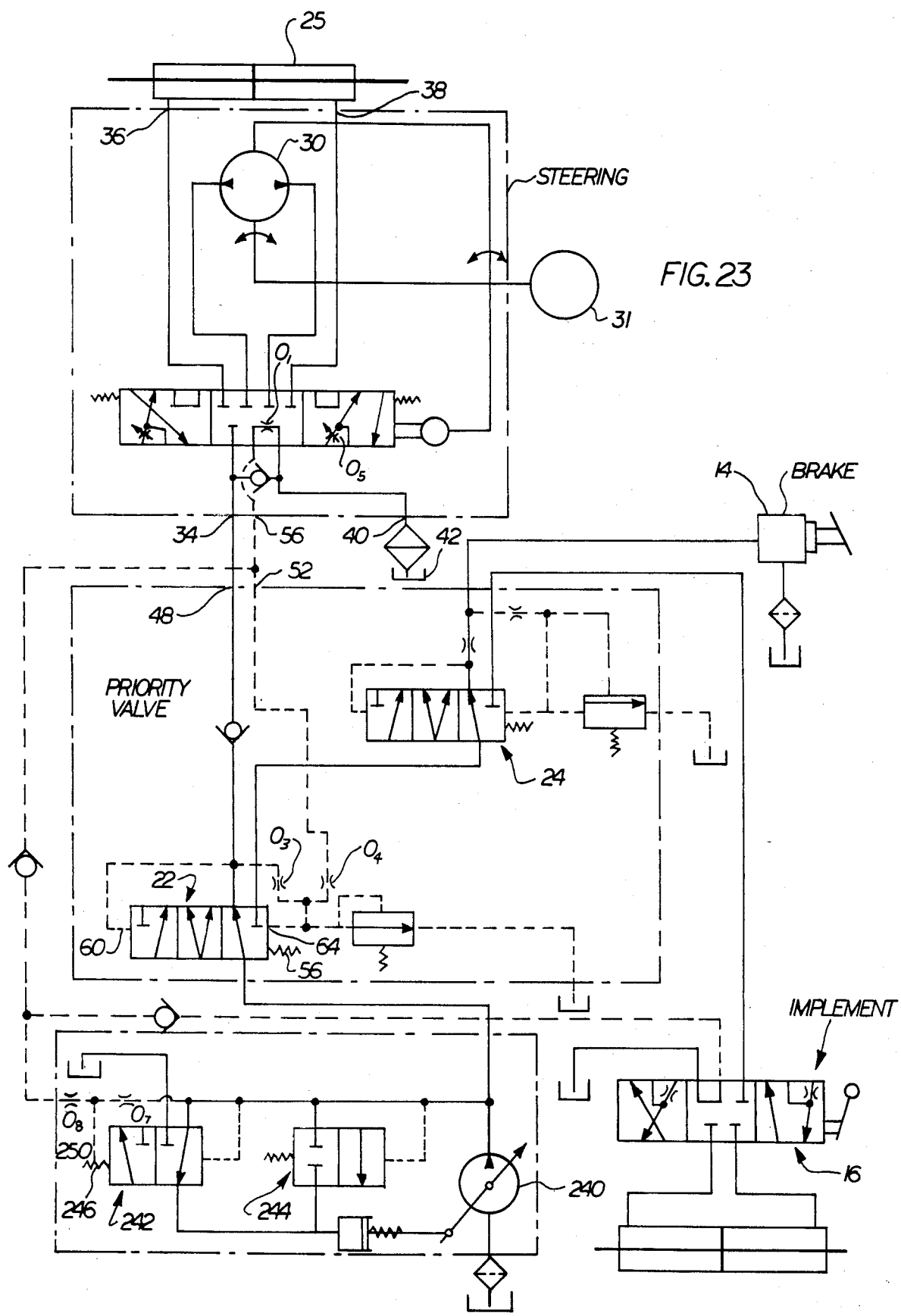

HYDROSTATIC LOAD SENSE STEERING SYSTEM

BACKGROUND AND SUMMARY OF THE INVENTION

This application relates to a load sense steering system with a priority valve which controls flow from a source to a steering circuit and one or more auxiliary circuits. The priority valve assures that flow needed for steering is made available to the steering circuit, and excess flow, beyond that needed for steering, is made available to the auxiliary circuit(s).

In the steering circuit, flow to and from a steering motor is controlled by a hydrostatic steering controller. The controller has a directional control valve and a positive displacement metering unit which are both operated by a rotatable steering wheel. When no steering is taking place, the steering controller is in a neutral position. When the steering controller is in neutral, the priority valve maintains a minimum standby fluid pressure at the controller, and makes the rest of the fluid from the source available to the auxiliary circuit(s). When the steering controller is operated by the steering wheel, the directional control valve, after a predetermined amount of movement away from neutral, opens a main flow control orifice to direct flow through the metering unit to the steering motor. Once the main flow control orifice opens, it can vary in size according to operator demand and steering load. The steering controller cooperates with the priority valve to insure that priority flow is provided to satisfy steering needs, and excess flow, beyond that need for steering, is made available to operate the auxiliary circuit(s).

The priority valve includes spool which is spring biased toward a priority position in which all flow through the valve is made available to the steering controller. Within the priority valve, a special pilot flow system directs a pilot flow of fluid across an orifice means to a pilot port. The pilot port in the priority valve is connected to a load sense port in the steering controller. Pressure in the pilot flow system upstream of the orifice means acts on the priority valve spool in opposition to the spring, and urges the spool in a direction restricting flow to steering and increasing flow to the auxiliary circuit(s). Pressure downstream of the pilot flow orifice means is communicated to a pilot fluid pressure chamber or cavity and acts on the priority valve in addition to the force of the spring.

The steering controller has a load sense cavity which communicates with its load sense port. The steering controller also has a neutral vent orifice which connects the load sense cavity to a reservoir when the controller is in neutral. Thus, when the controller is in neutral, a pilot flow of fluid is directed through the priority valve and the steering controller to the reservoir.

Upon actuation of the controller from its neutral position, but before the controller's main flow control orifice opens, the neutral vent orifice is substantially (i.e., at least 75%) closed. Closing the neutral vent orifice restricts the pilot flow of fluid and thereby increases the pressure throughout the pilot flow path. A dramatic pressure increase is produced in the pilot pressure chamber of the priority valve. That pressure increase assists the biasing spring to urge the priority valve spool rapidly toward its priority position.

The prior art includes load sensing steering systems for controlling flow from a source (e.g., a priority valve with a fixed displacement pump; a variable displacement pump). Such systems are described and illustrated in U.S. Pat. Nos. 3,931,711; 4,079,805; 4,167,893 and 4,043,419. Additionally, there are systems that incorporate flow control valves with pilot conduits which cooperate with directional control valve banks to maintain minimum standby pressures when the directional control valves are in neutral, to increase pressure when a directional control valve is actuated, and to dump excess flow to a reservoir. An example of such a system is shown in U.S. Pat. No. 3,815,477.

The system of the present invention represents an improvement over the systems of the foregoing art. For example, the system of the invention can provide a very fast response to steering needs, due to the dramatic increase in pressure which occurs in the pilot fluid pressure chamber of the priority valve before the main flow control orifice of the steering controller opens. Also, since the special pilot flow system originates within the priority valve of the invention, efficient pilot flow regulation and consistent response characteristics result.

The system according to the invention can either be provided with a fixed displacement pump or a variable displacement pump which has a flow compensator valve modified to incorporate a pilot flow system for controlling the output of the pump in accordance with demand.

BRIEF DESCRIPTION OF THE DRAWINGS

These and other objects of the invention will become further apparent from the following detailed description, taken with reference to the accompanying drawings wherein:

FIG. 17 is a top view of the housing of the priority valve for the system of FIG. 1;

FIG. 18 is a left end view of the priority valve housing of FIG. 17 taken from the direction 18—18;

FIG. 19 is a sectional view of the priority valve, taken along the line 19—19 in FIG. 18;

FIG. 20 is a fragmentary sectional view of a part of the priority valve taken along the line 20—20 in FIG. 19;

FIG. 21 is a fragmentary sectional view of the priority valve of FIG. 19 taken along the line 21—21;

FIG. 22 is a fragmentary view of a section of the priority valve, taken along line 22—22 in FIG. 17; and FIG. 23 is a schematic illustration of another system according to the invention incorporating a variable displacement pump.

DETAILED DESCRIPTION OF PREFERRED EMBODIMENT

Figure 1:
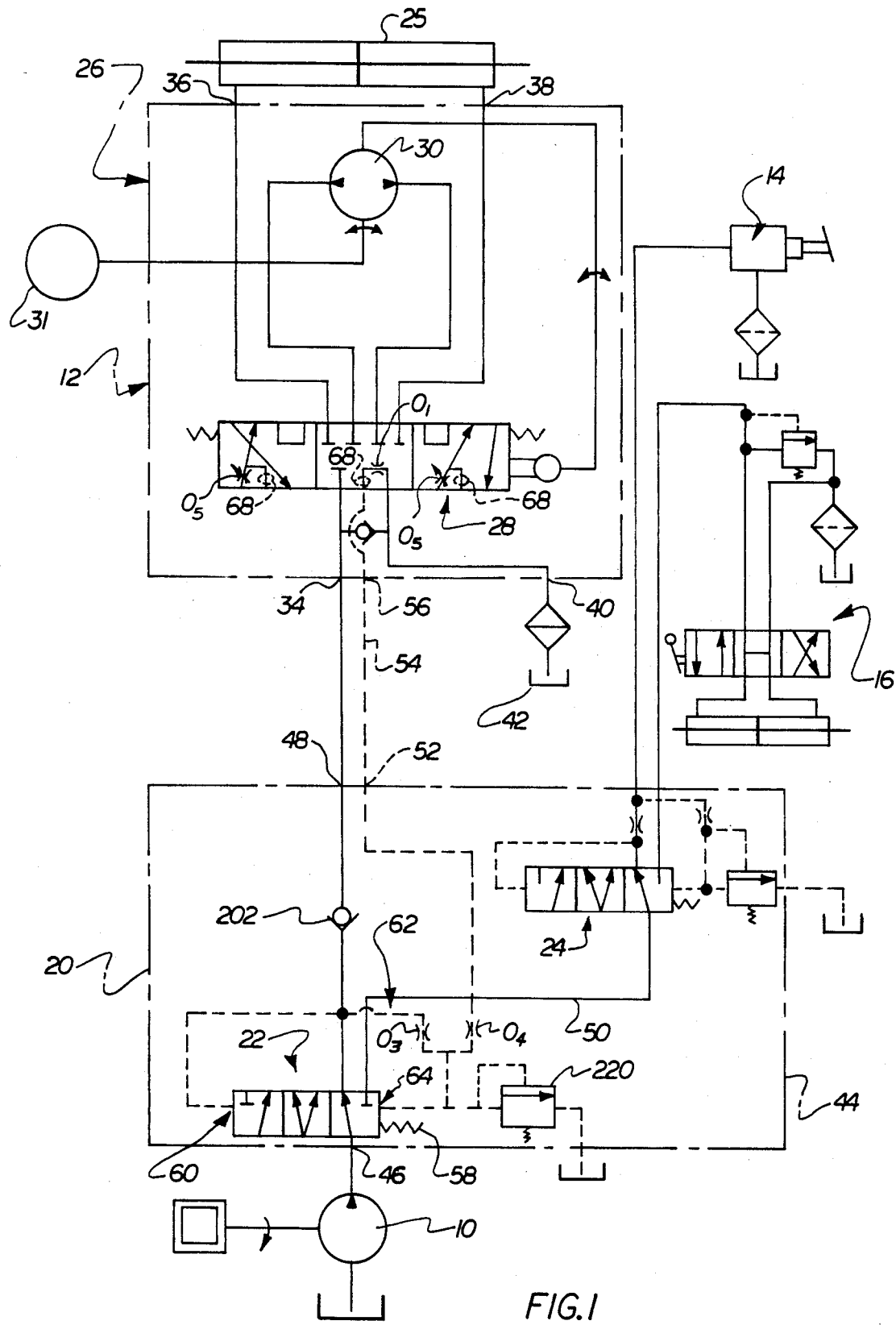
FIG. 1 is a schematic view of a steering system according to the principles of the invention.

FIG. 1 schematically shows a system according to the preferred embodiment of the invention. The system includes a fixed displacement pump 10 which provides flow for operating a steering circuit 12 and one or more auxiliary circuits. In FIG. 1, the auxiliary circuits include a brake circuit 14 and an implement circuit 16.

Flow from the pump is controlled by a priority valve assembly 20. As seen from FIG. 1, in the preferred embodiment, the priority valve assembly includes a main priority valve 22 and a brake priority valve 24. The main priority valve 22 controls flow between the steering circuit 12 and the auxiliary circuits 14 and 16. The brake priority valve 24 establishes a priority of flow between the brake circuit 14 and the implement circuit 16.

The steering circuit 12 includes a steering motor 25 and hydrostatic controller 26. Incorporated in the controller 26 is a directional control valve 28 and a positive displacement metering mechanism 30. The directional control valve is spring biased to a neutral position. The directional control valve is operated away from the neutral position by rotation of a steering wheel 31. When operated by the steering wheel 31, the directional control valve 28 directs flow from an inlet port 34 through the metering mechanism 30 and one of a pair of working ports 36, 38 to one side of the steering motor 25. Flow from the other side of the steering motor 25 is directed to a return port 40 connected to a reservoir 42.

When the steering controller is operated, the directional control valve 28, after a predetermined range of movement away from neutral, opens a main flow control orifice $O_5$ that directs flow from the inlet port 34 to the metering mechanism 30. The more the directional control valve moves away from neutral, the more the main flow control orifice $O_5$ increases in size. Further, the main flow control orifice $O_5$ may vary in size (i.e., increase or decrease) with variations in operator demand (the rate of movement of the steering wheel) and steering load, in accordance with the principles expressed in U.S. Pat. Nos. 4,079,805 and 3,931,711.

Referring to FIG. 1, the main priority valve 22 is disposed within a housing 44. The housing 44 includes an inlet port 46 connected to the pump 10, a steering priority flow outlet port 48 connected to the inlet port 34 of the steering controller, and an auxiliary passage 50 connected to the auxiliary circuit(s). Further, the housing 44 has a pilot port 52 connected (by conduit 54) with a load sense port 56 in the steering controller.

The spool of priority valve 22 is biased by a spring 58 toward a priority position in which it delivers all flow from the pump 10 to the inlet port 34 of the steering controller. The pressurized fluid directed to the outlet port 48 of the valve is also communicated to a chamber 60 on one side of the valve spool and acts on the valve spool in opposition to the force of the spring. That pressure urges the valve spool away from its priority position in a direction increasing flow to the auxiliary circuits 14 and 16 and decreasing flow to the steering circuit 12. Additionally, a pilot conduit 62 branches from the priority outlet flow, and directs a small pilot flow of fluid through an orifice $O_3$ that has a fixed area. The pilot conduit 62 communicates with the pilot port 52 through another fixed area pilot relief orifice $O_4$, which also within the priority valve. As seen from FIG. 1, pressure in the pilot line, between $O_3$ and $O_4$, is communicated with a pilot fluid chamber 64 and acts on the spool of the priority valve 22 in addition to the biasing spring.

A load sense cavity 68 within the steering controller 26 communicates with the load sense port 56. When the steering controller is in neutral, a neutral vent orifice $O_1$ communicates the load sense cavity 68 with the reservoir 42 via port 40. Thus, when the controller is in neutral, a pilot flow is directed to the reservoir from priority valve 22 through the conduit 62 and the orifices $O_3$ and $O_4$ in the priority valve, the conduit 54, and the neutral vent orifice $O_1$ in the controller. The pilot flow rate is determined by the area of orifice $O_3$ and the differential pressure thereacross. Because surface areas of the priority valve spool on which the pressures in cavities 60 and 64 act are equal, the differential pressure across orifice $O_3$ is effectively set by bias spring 58. Adjusting the preload, for example, on spring 58 can therefore adjust the pressure differential across orifice $O_3$.

When the controller is operated by the steering wheel 31, the spool of the directional control valve 28 moves away from neutral and, after a predetermined amount of travel, opens orifice $O_5$. Importantly, during the travel of the directional control valve away from neutral, and before the main flow orifice $O_5$ opens, the neutral vent orifice $O_1$ is substantially closed. By "substantially closed" it is contemplated that the orifice $O_1$ closes off at least about 75% of its flow area. The orifice $O_1$ may completely close before the main flow control orifice $O_5$ opens.

Thus, before the main flow orifice $O_5$ opens, the pilot flow is substantially decreased and the pressure in the pilot flow path, including the load sense cavity 68 and the pilot fluid chamber or cavity 64 in the priority valve, is substantially increased. The pressure rise is such that pressure in the pilot fluid chamber 64 is at least approximately equal to the pressure in chamber 60 on the other side of the priority valve spool. Thus, in the range of travel of the directional control valve 28 before the mail flow orifice $0_5$ opens, there is a dramatic increase in the pressure in the pilot flow path which virtually at least equalizes fluid pressures across the priority valve 22 and allows the spring 58 to urge the spool of the priority valve to its priority position. After the main flow control orifice $O_5$ opens, the load sense cavity 68 in the controller communicates with the downstream side of the main flow control orifice $O_5$. Thus, as the size of main flow orifice $O_5$ varies according to operator demand and/or steering load, pressure across the priority valve varies with variations in the size of the main flow control orifice $O_5$.

The importance of the foregoing construction is that it provides a sharp pressure increase, or pressure spike, on the priority valve spool in the small range of movement of the spool of the directional control valve away from neutral and toward a position in which the main flow control orifice begins to open. The pressure spike anticipates the need for fluid by the steering controller, and causes the priority valve to shift quickly to a priority position for directing flow to the steering controller.

Once the main flow control orifice $O_5$ of the steering controller has opened, the downstream side of orifice $O_5$ is communicated with the load sense cavity 68, which is being supplied pilot flow from pilot fluid chamber 64 of the priority valve, and with the inlet to the metering mechanism 30. Thus, pressure across the priority valve varies with variations in the area of the main flow orifice $O_5$, which directs flow from the steering inlet port to the metering mechanism. Since the area of orifice $0_5$ varies in accordance with the demand for flow (operator demand and steering load), the pressure across the priority valve varies with steering demand. Thus, once the main flow orifice $O_5$ of the steering controller is opened, it varies pressure across the priority valve according to demand. When flow from the pump exceeds the demand for fluid by the priority valve, excess flow can be delivered to the auxiliary circuit(s).

Figure 2:
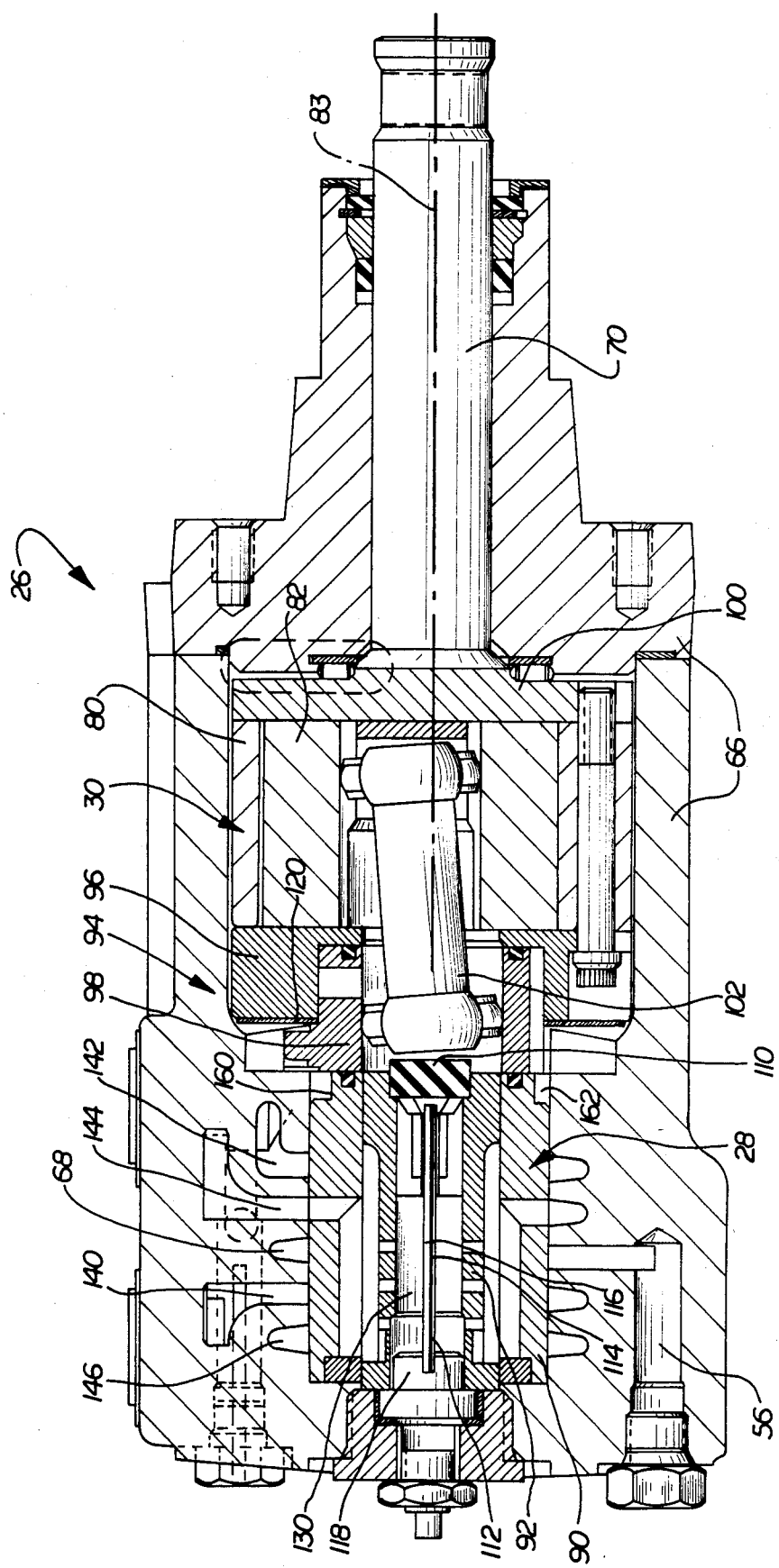
FIG. 2 is a longitudinal cross sectional view of a hydrostatic steering controller for the system of FIG. 1.
Figure 5:
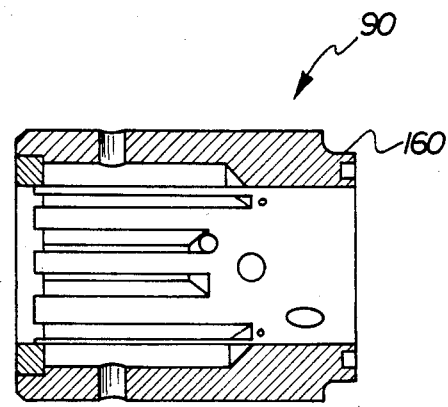
FIG. 5 is a sectional view of the sleeve valve member of FIG. 4 taken along the section line 5—5 of FIG. 4.

A cross sectional view of the steering controller is shown in FIG. 2. The controller includes a rotatable input shaft 70 which is operated by the vehicle steering wheel 31. The input shaft 70 extends into the controller housing 66. The controller housing 66 includes the inlet port 34 for connection with the priority valve, the return port 40 for connection with the fluid reservoir 42, a pair of working ports 36 and 38 connected to the opposite chambers of the steering motor 25 and the load sense pilot port 56.

The metering mechanism 30 is disposed within the controller housing 66. The metering mechanism is of the expanding-contracting pocket type formed by an outer gerotor gear 80 with internal teeth, and an inner gerotor gear 82 with external teeth which intermesh with the teeth of the outer gerotor gear. The inner gerotor gear 82 is eccentrically disposed relative to the outer gerotor gear 80 and has one less tooth than the outer gerotor gear 80. The outer gerotor gear 80 is rotatable about its central axis 83, which is coaxial with the central axis of the input shaft 70. The inner gerotor gear 82 is rotatable about its central axis and can also orbit about the central axis of the outer gear in the manner shown and described in U.S. Pat. No. 3,895,888. As the gear members 80, 82 rotate and orbit, the intermeshing teeth of the gear members define expansible and contractable fluid pockets.

The directional control valve 28 of the controller 26 includes a series of annular grooves on the inside of the housing, a valve sleeve 90 fixed in the housing, and a valve spool 92 which is rotatable within the valve sleeve 90.

Further disposed within the housing is a commutator valve arrangement 94. The commutator valve includes a pair of relatively rotatable valve members 96, 98 which control fluid to and from the expanding and contracting pockets of the metering mechanism 30 in timed movement to the relative rotation and orbital movement of the gerotor gear members 80 and 82 of the metering mechanism. The outer element of 96 of the commutator valve is bolted to the outer gerotor gear member 80 and to a drive plate 100 disposed on the other side of the gerotor gears 80, 82 as shown and described in U.S. Pat. No. 3,895,888. The inner valve element 98 of the commutator valve, which is disposed within the outer element 96, is coupled for joint rotation with the spool 92 of the directional control valve 28.

A drive link 102 is disposed at an angle to the central axis 83 of the input shaft. The drive link 102 is coupled to the inner gerotor gear member 82, and also to the inner commutator valve element 98. The inner commutator valve element 98 is connected by a key-and-slot arrangement 110 with the rotatable spool valve 92. Thus, the angular drive link 102 couples the commutator valve element 98, the rotatable spool valve member 92 and the inner gerotor gear 82 for joint rotational movement, and allows the inner gerotor gear 82 member to orbit relative to the central axis 83 of the outer gerotor gear member, as shown and described in U.S. Pat. No. 3,895,888.

A torsion spring 112 urges the rotatable valve element toward its neutral position. The torsion spring is preferably formed by a pair of blades 114, 116 which are disposed in openings in the spool valve member 92 and a support member 118 fixed in the housing. The construction of these torsion spring blades 114, 116 is basically in accordance with the principles disclosed in U.S. Pat. No. 3,918,856. The spring blades 114, 116 bias the valve spool 92 to the neutral position. Upon application of torque to the valve spool 92 tending to move the valve spool away from its neutral position, the blades 114, 116 are twisted. When the torque is discontinued, the blades 114, 116 urge the valve spool 92 towards its neutral position.

In order to limit the range of rotation of the gerotor gear member 82 and valve spool 92 away from neutral, a lug 120 is connected with the inner commutator valve element 98. Cooperating stops (not shown) fixed to the housing engage the lug 120 after a limited amount of rotation of valve element 92 in either direction from the neutral position. This limits the range of rotation of the gear member 82 and the valve spool 92.

When the steering wheel 31 is rotated, torque is transmitted through the gerotor gear members to the rotatable valve spool 92 and urges the spool away from its neutral position. The outer gear 80 rotates with the input shaft 70, and the inner gear 82 rotates to a limited extent to cause rotation of the valve spool 92. Rotation of the spool 92 opens flow to the metering mechanism 30, and directs metered flow to one side of the steering motor 25. Once the valve spool member 92 either (i) moves to the limit of its range of movement away from neutral, or (ii) reaches a steady state position (when flow equals demand), continued rotation of the input shaft 70 causes the inner gear member 82 to orbit only.

Figure 13:
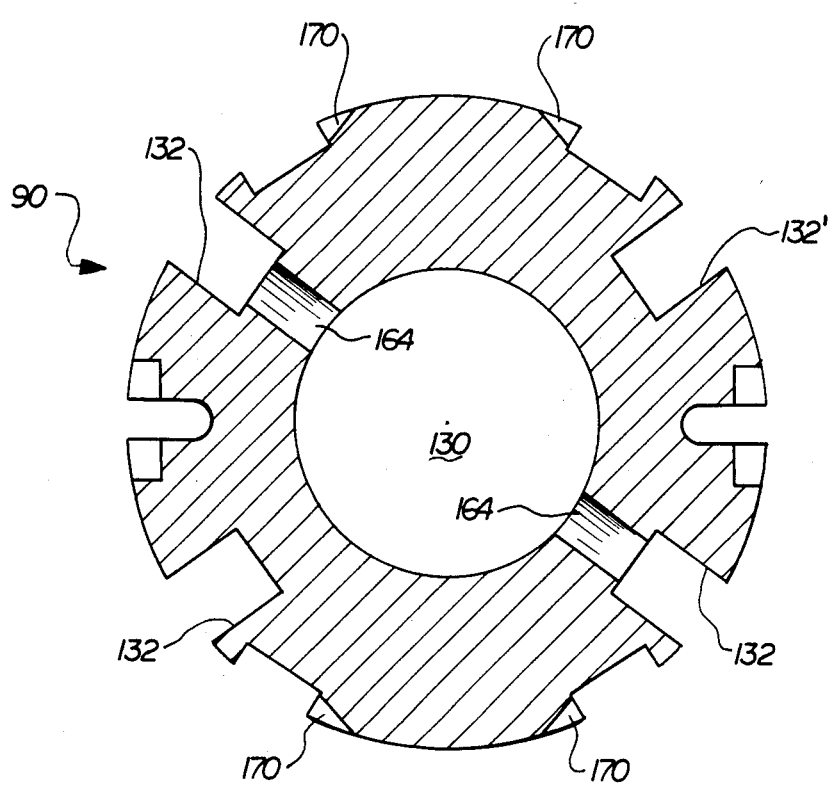
FIG. 13 is an enlarged sectional view of the spool valve member of FIG. 12 taken along the section line 13—13 of FIG. 12.
Figure 12:
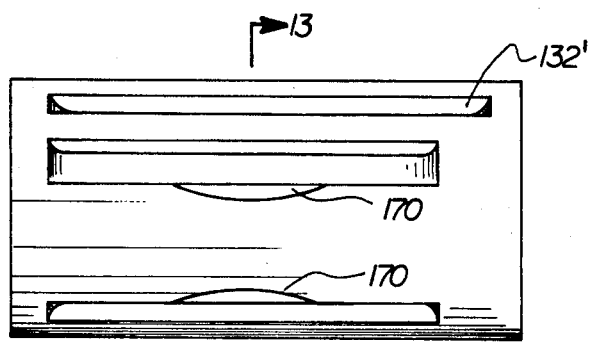
FIG. 12 is a side elevational view of a rotatable spool valve member used in the controller of FIG. 2.
Figure 14:
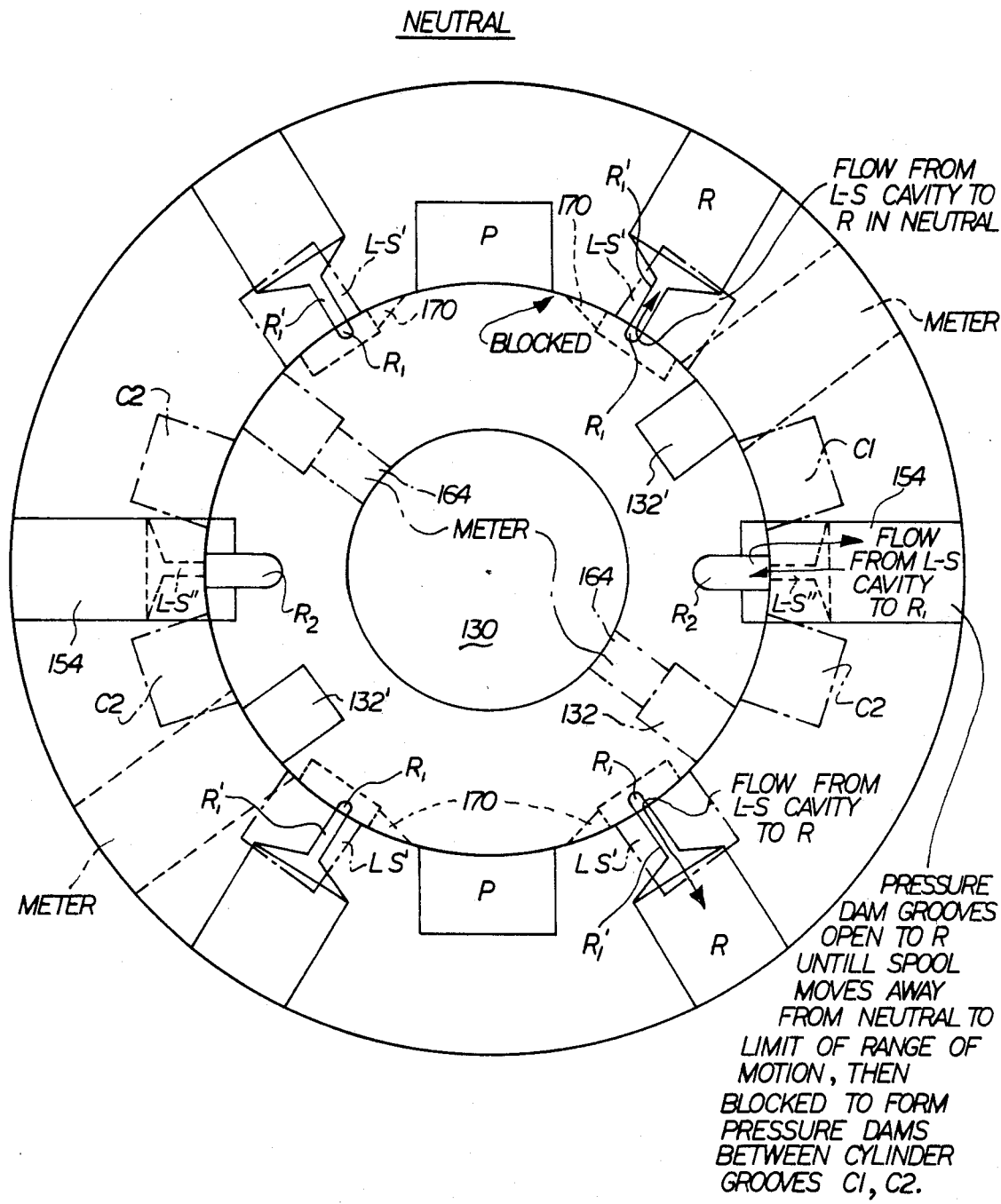
FIG. 14 is a schematic representation of the sleeve and spool valve members of the controller of FIGS. 2 through 13, illustrating the relative positions of the valve members in their neutral position.

As the valve spool 92 is moved away from its neutral position, it basically controls flow to and from the steering motor 25 in accordance with the principles of U.S. Pat. No. 3,895,888. As shown in FIG. 13, the valve spool 92 has two pairs of diametrically opposed passages 132 and 132' on its outer surface which bidirectionally interconnect the fluid flow to and from the metering mechanism 30 and the steering motor 25. Passages 132 are connected to the central cavity passage 130 by holes 164 that communicate with one side of the metering mechanism 30 through the commutator valve elements 96 and 98. As shown in FIGS. 12, 13 and 14, the valve spool 92 also has passages 132' which connect via holes 164' with the other side of the metering mechanism 30, also through the commutator valve elements 96 and 98.

Figure 3:
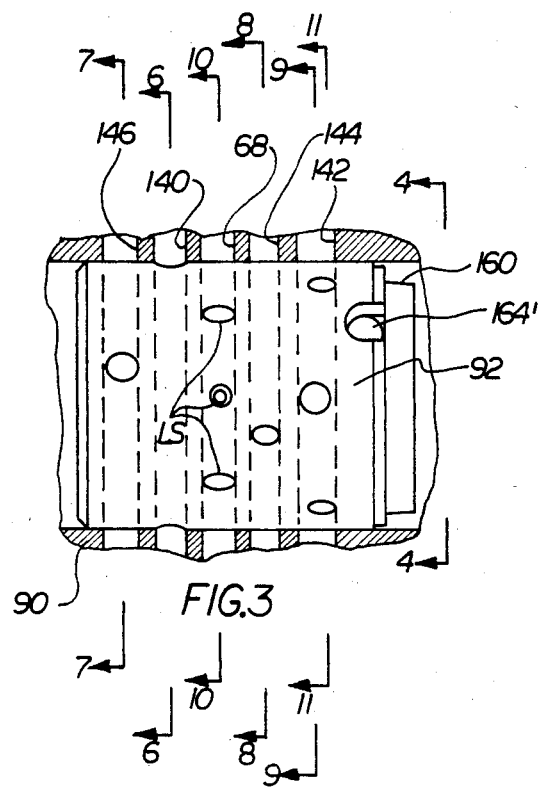
FIG. 3 is a fragmentary sectional view of a portion of the controller of FIG. 2 showing a side elevational view of a sleeve valve member in the controller.

As seen in FIGS. 2 and 3, the controller housing includes five annular grooves. An annular groove 140 communicates with the inlet port 34. An annular groove 142 communicates with the return port 40. A pair of annular grooves 144, 146 communicate with the working ports 36, 38. The annular groove 68 forms the load sense cavity and communicates with the load sense port 56.

Figure 10:
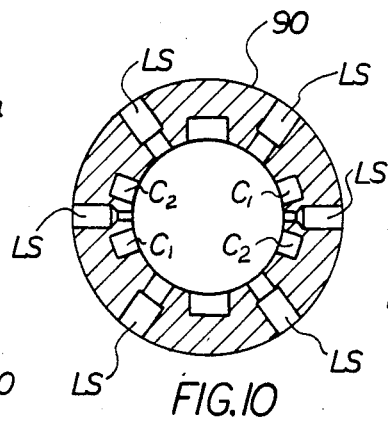

As seen from FIGS. 3 and 10, the fixed sleeve 90 includes six radial passages LS communicating with load sense cavity 68. Four of the passages LS communicate with longitudinal grooves LS' on the inside of the sleeve 90. The remaining two passages LS communicate with restricted openings LS" which extend to the inside of the sleeve 90.

Figure 7:
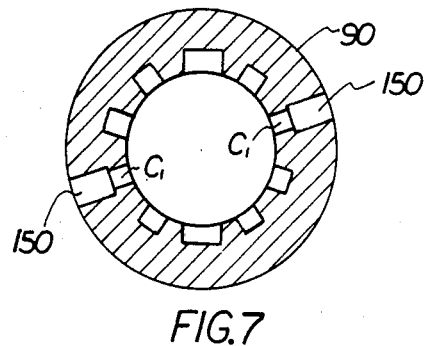
Figure 8:
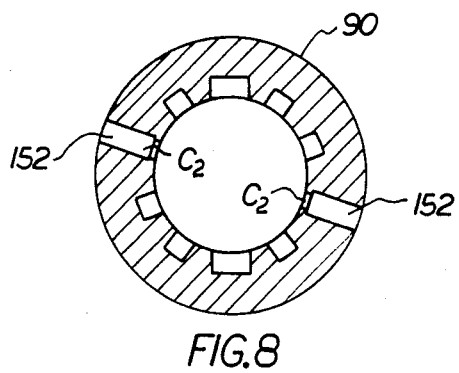
Figure 9:
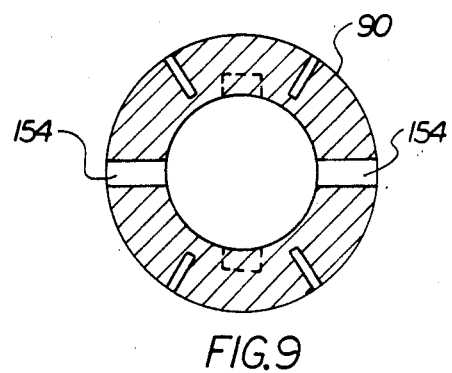
Figure 4:
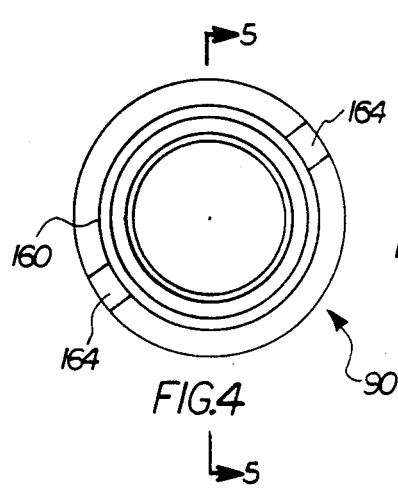
FIG. 4 is an end view of the sleeve valve member of FIG. 3 taken from the direction 4—4 of FIG. 3.

As shown in FIGS. 3 and 7, a first pair of diametrically opposed cylinder grooves $C_1$ on the inside of valve sleeve 90 are in fluid communication with one cylinder groove 146 in the housing through radial passages 150. As shown in FIGS. 3 and 8, a second set of diametrically opposed cylinder grooves $C_2$ on the inside of valve sleeve member 90 are in fluid communication with the other cylinder groove 144 in the housing through radial passages 152.

Figure 6:
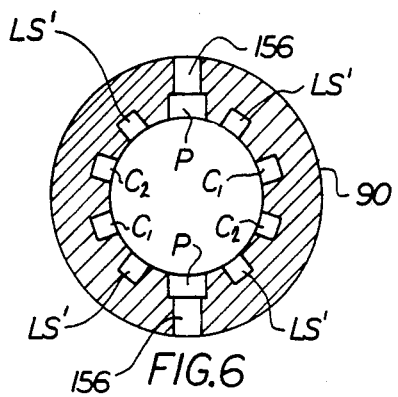
FIGS. 6 through 11 are sectional views of the sleeve valve member of FIG. 3 taken respectively along the sectional line 6—6, 7—7, 8—8, 9—9, 10—10, and 11—11 of FIG. 3.
Figure 11:
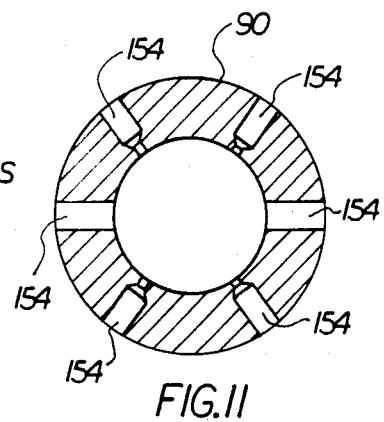

In addition, referring to FIGS. 3 and 11, a series of six radial passagways 154 in the valve sleeve 90 are in fluid communication with the return groove 142 in the housing. Also referring to FIGS. 3 and 6, a pair of inlet grooves P on the inside of the sleeve 90 communicate through radial passageways 156 with the annular inlet groove 140.

As seen from FIGS. 2, 3, 4 and 5, the end of valve sleeve member 90 which is adjacent the commutator valve includes an annular outer surface 160 having a reduced diameter. That surface forms part of meter space 162 disposed adjacent the commutator valve. A pair of diametrically opposed radial passages 164' in the valve sleeve 90 communicate the meter space 162 with the passages 132' in the valve spool 92.

The restricted openings LS" shown in FIG. 14 extend to the inside of the valve sleeve 90 and form pressure dams disposed between the cylinder grooves $C_1$, $C_2$ upon actuation of the valve spool 92 to its maximum rotation. The pressure dam openings LS" valve sleeve communicate with the annular load sense cavity 68 in the housing. Thus, each pressure dam opening LS" communicates with the pressure at the load sense cavity.

FIG. 14 schematically illustrates the valve sleeve and valve spool, in neutral. Pressure at the inlet port 34 communicates with diametrically opposed longitudinal passages P in the valve sleeve member 90. The load sense cavity 68 is communicated with the six LS passages disposed about the valve sleeve. In neutral, the grooves LS' communicate with the passages LS and in facing relation with longitudinal grooves $R_1$ in the valve spool 92, which communicate with the reservoir through restricted radially extending openings $R_1'$ in the valve sleeve 90. The restricted openings LS" communicate with the other two LS passages and are in facing relation with longitudinal grooves $R_2$ in the valve spool 92, which communicate with the reservoir through respective radial passages 154.

In neutral, pilot flow from the priority valve 20 at the load sense cavity 68 is directed into the four load sense grooves LS', through the longitudinal grooves $R_1$ in the rotatable valve spool, and to the return port through the restricted openings $R_1'$. Essentially, the four grooves LS' in the valve sleeve, which communicate through the restricted openings $R_1'$, form the orifice $O_1$ shown in the schematics of FIG. 1.

Figure 15:
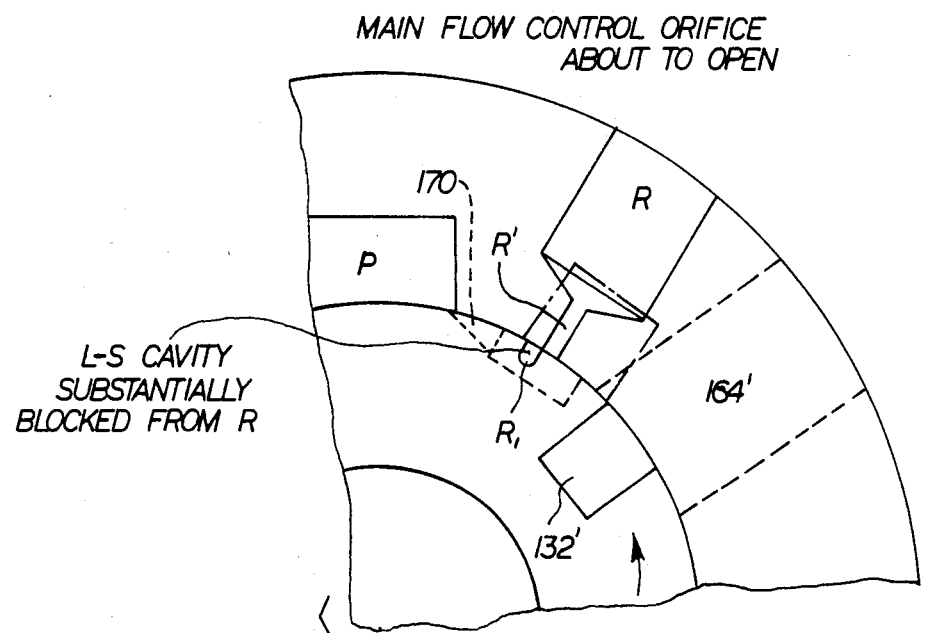
FIG. 15 is an enlarged schematic fragmentary representation of the valve members of FIG. 14 after a predetermined amount of travel away from the neutral position.
Figure 15:
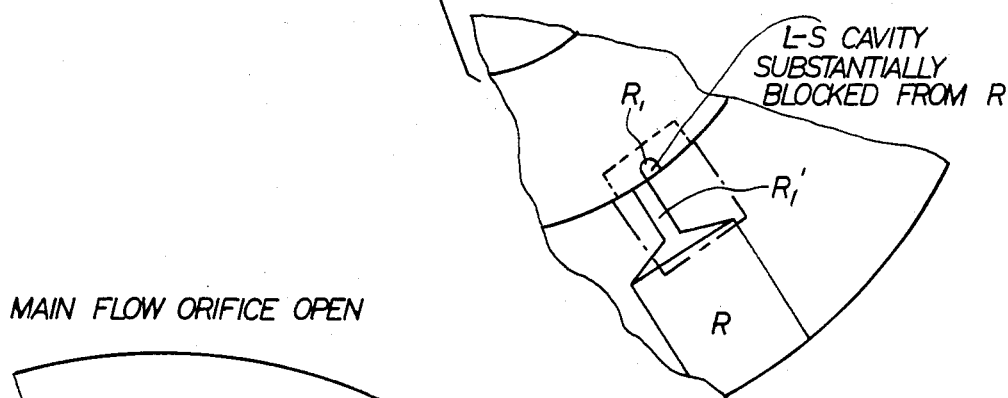
Figure 16:
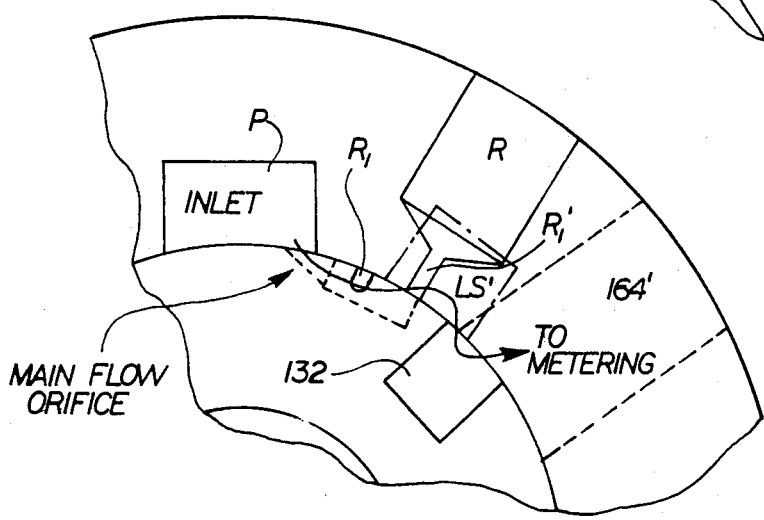
FIG. 16 is an enlarged schematic fragmentary representation of the valve members of FIG. 14, after further movement away from the neutral position.

As can be seen from FIGS. 15 and 16, movement of the directional control valve spool counterclockwise away from neutral, substantially blocks communication between the longitudinal grooves $R_1$ and the restricted return openings $R_1'$ before there is communication between the pressure groove P, and one of a pair of diametrically opposed grooves 170 in the valve spool. When the diametrically opposed grooves 170 in the spool move into communication with the pressure grooves, they cooperate to form a main flow control orifice (i.e., the orifice $O_5$ in FIG. 1). Preferably, the valve is designed so that communication of the pressure ports across the main flow orifice begins at about 3.3 degrees of valve travel away from neutral, and communication of the four load sense grooves LS' with the return groove $R_1$ is completely closed at 3.4 degrees of valve travel away from neutral. In FIG. 16, flow modulation occurs across the main flow orifice $O_5$ and is sensed at groove LS' which also is the source of the pilot flow. Both flows are directed to the inlet of the metering mechanism 30 via passages 132 as previously described.

When the valve rotates away from neutral to an operating position, but before the valve reaches its full travel position, the openings LS" remain in facing relation with the opposed passages $R_2$ in the valve spool which connect to the reservoir. When the valve spool moves to its full path of travel (i.e., when the lugs 120 engage their respective stops), the pressure dam openings LS" are closed by a surface of the valve spool in a manner similar to that shown in FIG. 15. That allows the pressure in the openings LS" supplied from cavity 68, to prevent leakage to return from whichever cylinder groove is communicating metered flow to the steering motor. A pressure dam is thus created in openings LS" only at the full travel of the valve member away from neutral and causes all flow supplied from the priority valve to be directed to the steering motor 25.

FIGS. 17–22 illustrate the specific structure of the priority valves for the system of the invention. The main priority valve 22 comprises a valve spool 190 movable in a bore 192 formed in a housing 194. The housing 194 includes an inlet groove 196 communicating with the inlet port 46, an auxiliary groove 198 for directing flow to the auxiliary circuits through passage 50, and a steering groove 200 connected with the outlet port 48 of the priority valve (through a check valve 202). The pilot port of the valve is connected to the load sense port 56 of the steering controller, as set forth above.

The valve spool 190 is biased by spring 58 toward the lefthand position shown in FIG. 19. In that position, flow at the inlet groove 196 communicates through steering groove 200 in the valve spool and is directed to the primary steering port 48. The pressure of that steering flow acts against a surface 210 representing the area of the lefthand end of the valve spool 190, and urges the valve spool in opposition to the spring. When pressure against surface 210 is high enough to shift the valve far enough toward the right against the action of the spring, the auxiliary groove 198 can open to allow flow to the auxiliary circuits.

The spring, or springs, 58 is disposed in pilot fluid chamber 64. Referring to FIG. 20, a conduit 214, which communicates with the steering groove 200 also communicates with the pilot fluid chamber through restrictor 216, which is orifice $O_3$ in the schematics of FIG. 1. Further, the pilot fluid chamber communicates with the pilot port through another restrictor 218, which is $O_4$ in FIG. 1.

Thus, the fluid pressure acting on the lefthand side of the valve spool 190 is the fluid pressure being directed to steering, and fluid pressure in the pilot fluid chamber on the righthand side of the valve spool is the fluid pressure in the pilot conduit between the orifice $O_3$ and the orifice $O_4$. The rate of pilot-oil flow, as previously described, is determined by the area of $O_3$ and the differential in pressure across the priority valve spool 190, which is effected by the bias of spring 58. The relief value shown at 220 in FIG. 1 is provided within the spool 190, and is not visible in FIG. 19. Accordingly, the valve operates between a priority position (the lefthand position) and a position directing flow to auxiliary, in accordance with the schematics of FIG. 1.

As seen from FIG. 19, the priority valve 24 is also within the housing, and directs flow between the auxiliary circuit(s). The priority valve 24 includes an inlet groove 230 communicating with passage 50, a groove 232 communicating with the brake circuit, and an auxiliary groove 234 communicating with the implement circuit. Also, a return groove 238 communicates with the reservoir 42. The valve functions in a similar manner to the main priority valve 22 to direct priority flow to the brake circuit, and excess flow to the implement circuit. It is believed the mechanics of valve 24 should be further apparent from the drawings, and need not be described hereinafter.

FIG. 23 illustrates a system which is similar to the system of FIG. 1, but which incorporates a variable displacement pump 240. In FIG. 23, elements corresponding to elements shown in FIG. 1 are designated with similar reference numerals. The system of FIG. 23 includes a flow compensating valve 242 and a pressure compensator valve 244 for controlling the displacement of the pump. A spring 248 urges the flow compensating valve 242 in a direction for increasing the displacement of the pump. Pressure from the pump acts on the valve in opposition to the spring 248. A pilot flow is directed through the flow compensating valve 242 through a pair of fixed size orifices $O_7$, $O_8$ and combines with the priority flow downstream of the priority valve, which is directed to the steering controller. Pressure between the orifices $O_7$, $O_8$ is communicated with a pilot fluid chamber 250 in the flow compensating valve and acts in addition to the spring 248. Accordingly, when the steering controller is in neutral, there is a pilot flow through the priority valve and also a pilot flow through the flow compensator valve 242. When the steering controller is operated, the pressure in the pilot line rapidly increases and shifts the flow compensator valve in a direction for increasing the displacement of the pump. When the control unit is in an operating position, the variable displacement pump is varied according to the demand of the steering control unit.

Throughout the foregoing description, orifices $O_3$ and $O_4$, for example, are described and illustrated as fixed area orifices. Nonetheless, the orifices could be variable in area. Also, while FIG. 23 shows a system that incorporates more than one motor and both a priority valve and a flow compensating valve with pilot flows, it would be possible to have a system according to the invention which incorporates a single motor, a controller, a variable displacement pump, and a flow compensating valve with a pilot flow through it. As there would only be one motor and one hydraulic circuit, no priority valve would be required and the flow compensating valve would simply control the pump displacement as described above.

What is claimed is:

1. A system for controlling fluid flow from a source to a motor including:
    a valve having a housing including an inlet for connection to the source, an outlet, and a pilot port,
    said valve including a movable valve element for establishing and controlling fluid passage means for increasing and decreasing flow from the source to the motor,
    means in said valve forming a pilot flow conduit branching from said fluid passage means and communicating through orifice means to said pilot port,
    biasing means for urging the movable valve element in a direction for increasing flow from the source to the motor,
    a first fluid pressure chamber on one side of the movable valve element and means communicating fluid pressure upstream of said orifice means with said first fluid chamber for urging the valve element against the bias of the spring and in a direction reducing flow to the motor,
    a pilot fluid chamber on the opposite side of the movable valve element and disposed so that fluid pressure therein acts on said movable valve element in addition to the force of the biasing means,
    means in said valve communicating pressure on the downstream side of said orifice means with the pilot fluid chamber,
    a hydrostatic controller including a housing having an inlet pressure port, a pair of working ports connected to opposite chambers of the motor, a return port connected to a reservoir, and a load sense port connected with the pilot port of the valve,
    said controller including directional control valve means operated by an input shaft and a positive displacement follow-up metering mechanism connected with said directional control valve means, said directional control valve means being biased to a neutral position and being movable away from said neutral position by operation of the input shaft,
    said directional control valve means forming a main flow control orifice means which opens to communicate flow from said inlet pressure port to said metering mechanism after a predetermined amount of movement of said directional control valve means away from said neutral position, said main flow control orifice varying in size as a fuction of the rate of operation of the input shaft and the load on the motor,
    said controller having a load sense cavity communicated with said load sense port and a neutral vent orifice means which, in neutral, also communicates said load sense cavity with said return port for allowing a pilot flow of fluid from the pilot port of said valve through said controller to the reservoir when the controller is in neutral,
    said directional control valve means substantially restricting flow through said neutral vent orifice means to the reservoir before the main flow control orifice opens, to provide a substantial increase in pressure in the pilot fluid chamber before the main flow control orifice opens.

2. A system for controlling fluid flow from a source to a steering motor and one or more auxiliary motors including:
- a priority valve having a housing including an inlet port for connection to the source, a priority flow outlet port, an auxiliary flow outlet port and a pilot port,
- said priority valve including a movable valve element for establishing and controlling flow passage means between said inlet port, said priority flow outlet port and said auxiliary flow outlet port,
- means in said priority valve forming a pilot flow conduit branching from said flow passage means and communicating through fixed size orifice means with said pilot port,
- a biasing spring for urging the movable valve element toward a priority position directing all flow from said inlet port to said priority port,
- a first fluid pressure chamber on one side of the movable valve element and means communicating fluid pressure upstream of said fixed orifice means with said first fluid chamber for urging the movable valve element against the bias of the spring and in a direction reducing flow to the priority port and increasing flow to the auxiliary port,
- a pilot fluid chamber on the opposite side of the movable valve element and disposed so that fluid pressure therein acts on said movable valve element in addition to the force of the biasing spring,
- means in said priority valve communicating pressure on the downstream side of said fixed size orifice means with the pilot fluid chamber,
- a hydrostatic steering controller including a housing having an inlet pressure port connected to the priority flow outlet port of the priority valve, a pair of working ports connected to opposite chambers of the steering motor, a return port connected to a reservoir and a load sense port connected with the pilot port of the priority valve,
- said steering controller including directional control valve means and a positive displacement follow-up metering mechanism operated by a steering wheel, said directional control valve means being biased to a neutral position and being movable away from said neutral position by operation of the steering wheel,
- said directional control valve means forming a main flow control orifice means which opens to communicate flow from said inlet pressure port to said metering mechanism after a predetermined amount of movement of said directional control valve means away from said neutral position, said main flow control orifice varying in size as a function of the rate of operation of the steering wheel and the steering load,
- said steering controller having a load sense cavity communicated with said load sense port and a neutral vent orifice means which, in neutral, also communicates said load sense cavity with said return port for allowing a pilot flow of fluid from the pilot port of said priority valve through said steering controller to the reservoir when the directional control valve means is in neutral,
- said directional control valve means substantially restricting flow through said neutral vent orifice to the reservoir before the main flow control orifice opens, to provide a substantial increase in pressure in the pilot fluid chamber before the main flow control orifice opens.

3. A system for controlling fluid flow from a source to a steering motor and one or more auxiliary motors including:
- a priority valve having a housing including an inlet port for connection to the source, a priority flow outlet port, an auxiliary flow outlet port and a pilot port,
- said priority valve including a movable valve element for establishing and controlling flow passage means between said inlet port, said priority flow outlet port and said auxiliary flow outlet port,
- means in said priority valve forming a pilot flow conduit branching from said flow passage means and communicating through fixed size orifice means with said pilot port,
- a biasing spring for urging the movable valve element toward a priority position directing all flow from said inlet port to said priority port,
- a first fluid pressure chamber on one side of the movable valve element and means communicating fluid pressure upstream of said fixed orifice means with said first fluid chamber for urging the movable valve element against the bias of the spring, and in a direction reducing flow to the priority port and increasing flow to the auxiliary port,
- a pilot fluid chamber on the opposite side of the movable valve element and disposed so that fluid pressure therein acts on said movable valve element in addition to the force of the biasing spring,
- means in said priority valve communicating pressure on the downstream side of said fixed size orifice means with the pilot fluid chamber,
- a hydrostatic steering controller including a housing having an inlet pressure port connected to the priority flow outlet port of the priority valve, a pair of working ports connected to opposite chambers of the steering motor, a return port connected to a reservoir and a load sense port connected with the pilot port of the priority valve,
- said steering controller including directional control valve means and a positive displacement follow-up metering mechanism operated by a steering wheel, said directional control valve means being biased to a neutral position and being movable away from said neutral position by operation of the steering wheel,
- said directional control valve means forming a main flow control orifice means which opens to communicate flow from said inlet pressure port to said metering mechanism after a predetermined amount of movement of said directional control valve means away from said neutral position, said main flow control orifice varying in size as a function of the rate of operation of the steering wheel and the steering load,
- said steering controller having a load sense cavity communicated with said load sense port and a neutral vent orifice means which, in neutral, also communicates said load sense cavity with said return port for allowing a pilot flow of fluid from the pilot port of said priority valve through said steering controller to the reservoir when the directional control valve means is in neutral,
- said directional control valve means substantially restricting flow through said neutral vent orifice to the reservoir before the main flow control orifice opens, to provide a substantial increase in pressure in the pilot fluid chamber before the main flow control orifice opens, said load sense cavity being connected to the downstream side of the main flow control orifice when the main flow control orifice is in an open condition, so that pressures across the movable value element of the priority valve are varied with pressue variations across said main flow control orifice.

4. A system for controlling fluid flow from a source to a steering motor and one or more auxiliary motors including:

a priority valve having a housing including an inlet port for connection to the source, a priority flow outlet port, an auxiliary flow outlet port and a pilot port, said priority valve including a movable valve element for establishing and controlling flow passage means between said inlet port, said priority flow outlet port and said auxiliary flow outlet port, means in said priority valve forming a pilot flow conduit branching from said flow passage means and communicating through fixed size orifice means with said pilot port, a biasing spring for urging the movalbe valve element toward a priority position directing all flow from said inlet port to said priority port, a first fluid pressure chamber on one side of the movable valve element and means communicating fluid pressure upstream of said fixed orifice means with said first fluid chamber for urging the valve against the bias ofthe spring and in a direction reducing flow to the priority port and increasing flwo to the auxiliary port, a pilot fluid chamber on the opposite side of the movable valve element and disposed so that fluid pressure therein acts on said movable valve element in addition to the force of the biasing spring, means in said priority valve communicating pressure on the downstream side of said fixed size orifice means with the pilot fluid chamber, a hydrostatic steering controller including a housing having an inlet pressure port connected to the priority flow outlet port of the priority valve, a pair of working ports connected to oposite chambers of the steering motor, a return port connected toa reservoir and a load sense port connected with the pilot port of the priority valve, said steering controller including directional control valve means and a positive displacement follow-up metering mechanism operated by a steering wheel, said directional control valve means being biased to a neutral position and being movable away from said neutral position by operation of the steering wheel, said directional control valve means forming a main flow control orifice means which opens to communicate flow from said inlet pressure port to said metering mechanism after a predetermined amount of movement of said directional control valve away from said neutral position, said main flow control orifice varying in size as a function of the rate of operation of the steering wheel and the steering load, said steering control having a load sense cavity communicated with said load sense port and a neutral vent orifice means which, in neutral, also communicates said load sense cavity with said return port for allowing a pilot flow of fluid from the pilot port of said priority valve through said steering controller to the reservoir when the steering controller is in neutral, said directional control valve means substantially restricting flow through said neutral vent orifice to the reservoir before the main flow control orifice opens, to provide a substantial increase in pressure in the pilot fluid chamber before the main flow control orifice opens, said load sense cavity being connected to the downstream side of the main flow control orifice when the main flow control orifice is in an open condition, so that pressures across the priority valve are varied with pressure variations across said main flow control orifice, and wherein the source of fluid comprises a variable displacement pump, a flow compensator valve for controlling the displacement, of said variable displacment pump, a biasing spring acting on said flow compensator valve in a first direction for placing the pump in a minimum displacement position, means branching from the outlet of said pump and communicating across fixed size orifices means with the load sense port of said steering controller, means communicating pressure upstream of said fixed orifice means with the load sense port of said steering controller, means communicating pressure upstream of said fixed orifice means with a fluid chamber acting on the valve in opposition to the biasing spring, and means communicating pressure downstream of said fixed orifice means to a fluid chamber acting on said flow compensator valve in addition to said biasing spring.

5. A system as defined in claim 4 wherein said pilot flow conduit branches from the priority flow output port and includes first and second fixed orifices in series between the priority flow outlet port and the pilot port, means in said priority valve communicating pressure between said first and second orifices with said pilot fluid pressure chamber.

6. A system for controlling flow from a source to a steering motor comprising, a controller including ahousing having an inlet port, a pair of working ports connected to the steering motor, a return port connected to a reservoir, and a load sense port, said controller including directional control valve means and a positive displacement follow-up metering unit connected with said directional control valve means, said directional control valve means being biased to a neutral position and being movable away from said neutral position by operation of an input shaft, said directional control valve means defining a main flow control orifice means which communicates said inlet port with said metering unit after a predetermined amount of movement of said directional control valve means away from said neutral position, said main flow control orifice varying in size as a function of the rate of operation of the input shaft and the load on the steering motor, a priority valve means having a valve spool which is biased to a priority position in which it defines a flow path directing all fluid from the source to the inlet port of said controller, said priority valve spool being movable away from its priority position in response to a predetermined net fluid pressure force thereon, said priority valve spool, as it moves away from its priority position, (i) gradually reducing said flow path, and (ii) establishing and gradually increasing a flow path directing fluid from the source to an auxiliary circuit, pilot conduit means branching from said flow path and directing a pilot flow of fluid to said load sense port of said controller, pressure in said pilot conduit means communicating with one side of said priority valve spool, the pressure on said one side of said priority valve producing a force on said priority valve spool in a direction for urging said priority valve spool toward its priority position, said controller having pilot flow control means including pilot flow orifice means for directing the pilot flow of fluid from said load sense port through said controller and to the reservoir when said directional control valve means is in said neutral position, said directional control valve means restricting the pilot flow through said controller to the reservoir as the directional control valve means moves away from said neutral position and before said main flow control orifice establishes flow from said inlet port to said metering unit, for increasing the pressure in said pilot conduit means as said controller moves away from neutral, and producing a pressure force on said priority valve for moving said priority valve toward its priority position.

7. A system as set forth in claim 6 wherein said priority valve includes a fluid pressure cavity on said one side of said valve spool and a biasing spring disposed in said fluid pressure cavity and biasing said valve spool toward its priority position, said pilot conduit means directing the pilot flow of fluid through said fluid pressure cavity and to the load sense port of the controller.

8. A system as set forth in claim 7, wherein said directional control valve means also communicates one side of said main flow control orifice with said load sense port when said main flow control orifice is directing flow from said inlet port to said metering units, so that when said main flow control orifice is directing flow to said metering unit pressure changes due to changes in flow through said main flow control orifice affect the pressure in said pilot conduit means.

* * * * *